United States Patent [19]

Shea, Jr.

[11] 4,175,723
[45] Nov. 27, 1979

[54] METHOD AND APPARATUS FOR NEUTRALIZING THE EFFECT OF ACCELERATING AND DECELERATING FORCES

[75] Inventor: Frederick L. Shea, Jr., Johnson City, Tenn.

[73] Assignee: Great Lakes Carbon Corporation, New York, N.Y.

[21] Appl. No.: 892,998

[22] Filed: Apr. 3, 1978

[51] Int. Cl.² .......................... B64G 1/00; B64D 11/06
[52] U.S. Cl. .................................... 244/162; 244/121; 244/122 R; 244/122 AG; 297/216
[58] Field of Search ................. 244/1 R, 2, 12.2, 23 C, 244/118 P, 122 R, 121, 140, 162, 93, 122 AG; 297/216

[56] References Cited

U.S. PATENT DOCUMENTS

| | | | |
|---|---|---|---|
| 2,611,562 | 9/1952 | Exton, Jr. | 244/122 R |
| 2,740,599 | 4/1956 | Roberts-Horsfield | 244/122 R |
| 2,985,413 | 5/1961 | Widmanstetter | 244/140 |
| 2,986,361 | 5/1961 | Codding | 244/140 |
| 3,173,627 | 3/1965 | Cohen | 244/162 |
| 3,633,849 | 1/1972 | Kling | 244/23 C |
| 3,826,434 | 7/1974 | Beckh | 244/122 R |

OTHER PUBLICATIONS

Fraser, "Human Response to Sustained Acceleration," 1966, NASA-SP-103, pp. 1-5, 7-9.

Primary Examiner—Galen L. Barefoot
Attorney, Agent, or Firm—Adrian J. Good

[57] ABSTRACT

A man-carrying vehicle modified with a device for alleviating accelerative forces particularly useful for space travel is provided with a personnel carrier which automatically orients its occupant, with an imaginary Z-axis parallel to the spinal column and through the centers of mass of cross sections of the body and of the head perpendicular to the Z-axis such that the Z-axis is in a position normal to the resultant of the forces of acceleration, and which rotates the occupant about the Z-axis to alleviate or counteract the effects of the forces of acceleration in the X and Y directions normal to the Z-axis.

4 Claims, 4 Drawing Figures

METHOD AND APPARATUS FOR NEUTRALIZING THE EFFECT OF ACCELERATING AND DECELERATING FORCES

BACKGROUND OF THE INVENTION

Since the earliest days of powered flight, pilots have been testing the limits of the capabilities of their bodies and of their craft, with resulting injuries, death, and destruction of their craft. Of the stresses placed upon powered flight vehicles and their occupants, those originating in the various forces of acceleration have been prominent as causes of injurious strains in both pilots and craft, causing losses of consciousness and vision by pilots and structural failure of the craft.

Early aircraft were not rigid enough to withstand high forces and had relatively low power, which limited the forces to which the pilots were subjected, for the most part, to those below the threshold of disabling stress. In the 1930's with the development of truly high speed warplanes, then jet engines in the 1940's, and rocket engines in the 1950's, attainable forces of acceleration increased markedly, and the problem became extremely acute.

Acceleration is defined as a rate of change of velocity. It may occur linearly simply due to a change in velocity in a fixed direction or it may occur as a result of a change in direction. If the human body is defined as having three axes, by the conventional definition as used in the aerospace industry, see Fraser, *Human Response to Sustained Acceleration*, NASA SP-103, Library of Congress Catalog No. 66-60042 (1966), the X-axis is perpendicular to the vertebral column in the antero-posterior or in the forward and backward directions, the Y-axis is perpendicular to the vertebral column in the lateral direction to the right and left; and the Z-axis is parallel to the vertebral column through the approximate center of mass of cross-sections of the body and the head perpendicular to the Z-axis.

"Z" is the vertical axis through the approximate centers of mass of the cross-sections of the body and the head perpendicular to the Z-axis. For the purpose of the discussions in this application the subject is facing directly forward in the $+X$ direction. The $-Y$ direction is to the subject's left and the $+Y$ direction is to the subject's right.

"G" is used to indicate the resultant of body acceleration in gravitational units. Thus $+G_z$ indicates that the heart is displaced caudally downward; $+G_x$ indicates that the heart is displaced toward the back; and $+G_y$ indicates displacement of the heart to the left of the subject, for accelerative displacements respectively upward, forward, and to the right of the subject.

Acceleration is also classified according to the length of time sustained. Abrupt acceleration is defined by Fraser, *Human Response to Sustained Acceleration*, supra, as $\leq 0.2$ seconds, brief acceleration as $\leq 10$ seconds, and prolonged acceleration as greater than 10 seconds.

"To the human engineer, man is a thin flexible sack filled with thirteen gallons of fibrous and gelatinous material, inadequately supported by an articulated bony framework. Surmounting this sack is a bone box filled with gelatinous matter attached to the sack by means of a flexible coupling of bony and fibrous composition. Fuel and lubricants are conveyed to all parts of this machine by flexible hydraulic systems with low pressure tolerances activated by a central pump." Stapp, *Military Surgeon*, 103:99, 1948.

Thus the primary effect of acceleration is that upon the fluid systems of the body, and particularly on the most vital, the vascular system. A calculation of the effect of a $+5G_z$ acceleration on an upright subject shows that without compensation or adjustment, the blood pressure at the base of the brain would be zero, at the feet equivalent to 370 mm Hg, and the subject unconscious. Physiological compensation may alleviate this somewhat, but this is generally found an accurate prediction.

Acceleration in the $-G_z$ direction is more stressful than in the $+G_z$ direction, with cerebral and petechial hemorrages being observed.

Accleration in the X and Y axial directions has generally been found to have less effect upon the body since it does not place as much stress upon the vascular system. Accordingly, almost all those subjected to high G forces have been in a horizontal or semi-reclining position. This alleviates the gross differentials in hydrostatic pressure, and is also more comfortable in sustained flight.

Special suits have also been widely used, which apply air pressure for breathing and also pressurize the extremities to counteract the hydrostatic imbalance.

Physical and mental training of aircrew are also both highly important in negating and relieving the effects of acceleration. In particular, practice in specialized breathing techniques are helpful.

All of the above techniques are being used to lessen the effects of acceleration, and have their own utility.

One area of study which has been relatively neglected is that relating to time duration. In order to reach an orbital velocity of 18,000 m.p.h., it is necessary to sustain a total acceleration of 820 G-seconds, and to reach an escape velocity, about 1,140 G-seconds. The constraints due to the difficulties in obtaining this prolonged acceleration have made modifications in this area very difficult to achieve, and the approach heretofore has been merely to endure the acceleration and alleviate its effects, rather than attempt to significantly modify it, particularly with positive acceleration to ultimate velocity. Deceleration on re-entry of space vehicles has necessarily been handled by holding maximum forces to those sustainable by the crew.

Several investigators have found that the effects of acceleration are strongly time-dependent, with a latent period of 0.2 seconds required for the development of hydrostatic effects, and some accommodation by the body to longer periods of over 5 seconds.

A thorough discussion of the subject is given by Fraser, *Human Response to Sustained Acceleration*, supra.

A multi-directional anti-G device is disclosed in U.S. Pat. No. 2,985,413 to Widmanstetter, in which a capsule may be rotated to maintain the occupant with his Z-axis normal to the acceleration. A similar device is also disclosed in U.S. Pat. No. 2,611,562 to Exton. Both of these maintain the body of the pilot with his Z-axis normal to major acceleration but provide no means of neutralizing the movement of body fluids and suspended solids due to the forces perpendicular to the Z-axis. See also T. R. Potter, *Acceleration Protection, Bibliography No. 462*, North Carolina Science and Technology Research Center, Research Triangle Park, N.C. 27709, Aug. 24, 1976.

SUMMARY OF THE INVENTION

This invention deals with a means for alleviating the effects of acceleration upon the human body. It has been recognized that the effect of acceleration, where less than that causing gross physiological damage, is not instantaneous, and that considerable acceleration may not affect the body severely if the duration is limited to a short period of time.

This invention is a method and apparatus and for limiting the duration of any force of acceleration in a particular direction with respect to the body to a time less than that necessary to effect a serious strain upon the human body.

Since the human body can withstand much higher stresses in the X and Y-axes than either in the + or − directions of the Z-axis, it is desirable to have the body with the Z-axis normal to the resultant of the forces.

The invention is directed further to the alleviation of the forces stressing the body in the X and Y directions.

In order to accomplish the above, means are employed to automatically maintain the body in a position with the Z-axis normal to the resultant of the forces of acceleration. This can be accomplished by methods well known in the art, using proper mechanical design or using accelerometers with automatic response to control positioning devices, whether electrical, mechanical, hydraulic or pneumatic.

To use the time lag between the onset of acceleration and the resulting effects in the human body, this invention utilizes a powered rotation of the body about the Z-axis at a speed rapid enough to prevent the onset of any serious effects of the acceleration, limiting the time that any force in a particular direction perpendicular to the Z-axis is effective. If the frequency of rotation is 2.5 C.P.S. or 150 C.P.M., the time to effect complete reversal of the force perpendicular to the Z-axis is only 0.2 second. The rotational speed will necessarily be selected in relationship to variables such as the duration and magnitude of the acceleration and the individual characteristics of the subject.

In order to fully and most adequately support the body, a complete form fitting restraint is provided, effective in the four quadrants corresponding to the $+G_x$, $-G_x$, $+G_y$ and $-G_y$ vectors experienced as the body rotates about the Z-axis.

DETAILED DESCRIPTION OF THE INVENTION

Figure 1:
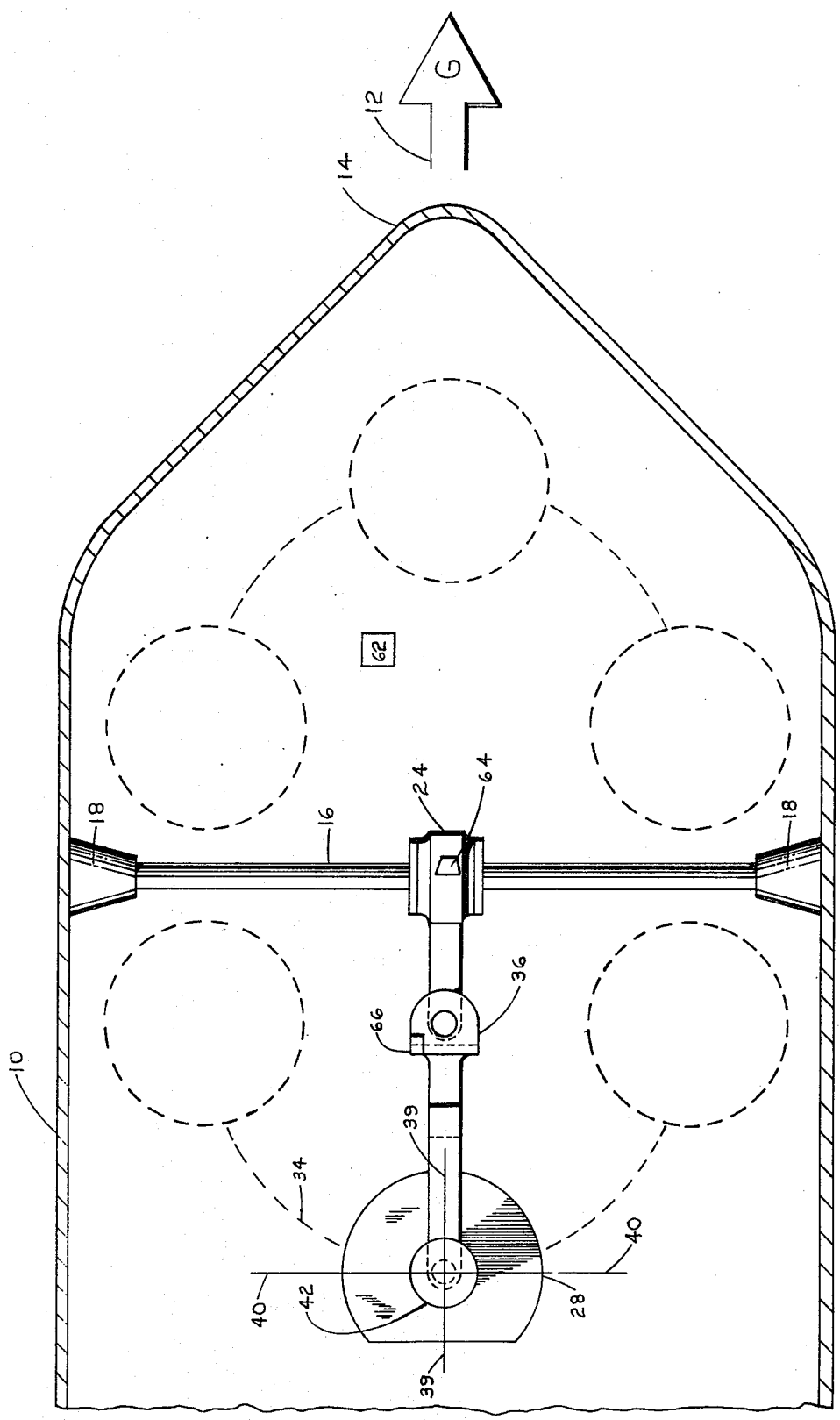

FIG. 1 shows a vehicle 10, X-axis 39, Y-axis 40, with nose 14, accelerative force 12, axle 16 in mountings 18, rotating mounting 24 angularly movable in a first plane, pin swivel joint 36 allowing angular movement in a second plane normal to the first plane, and personnel carrier 28 powered by motor 42. Personnel carrier 28 is thus enabled to move simultaneously in the first plane normal to axle 16 and through arc 34 in a second plane through axle 16.

Figure 2:
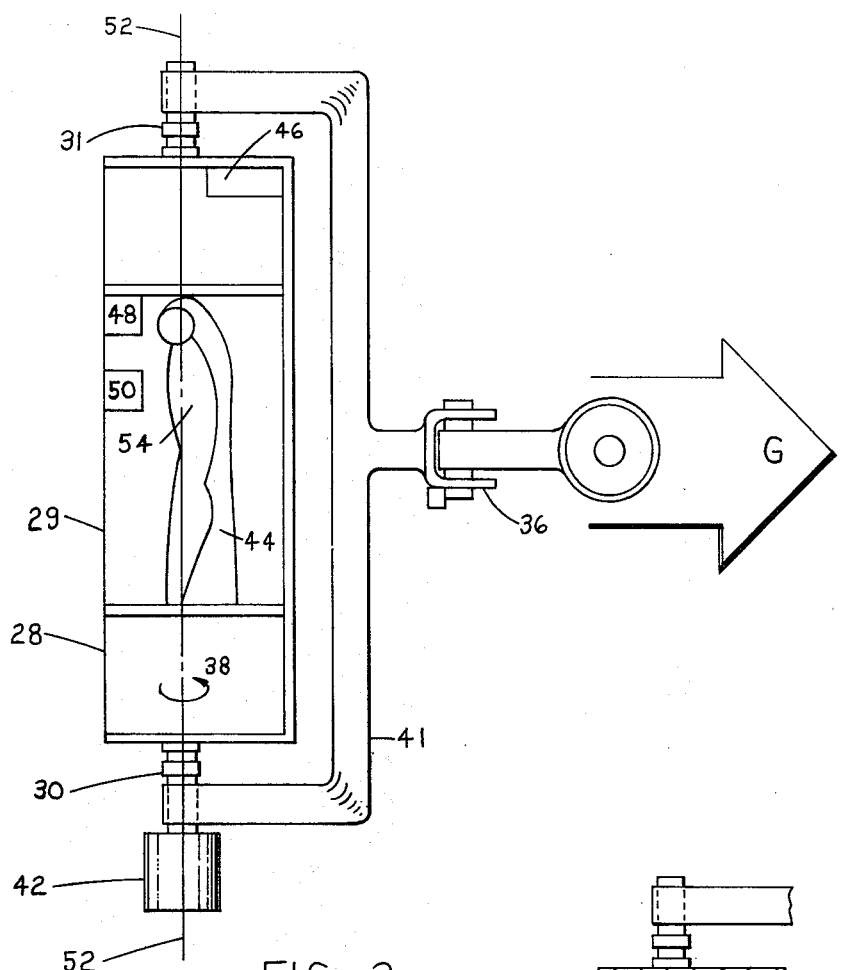

FIG. 2 shows personnel carrier 28 rotating as indicated by 38 in yoke 41, carrying crew member 54 in a form fitting restraint 44 with breathing atmosphere 46, communication means 48 and controls 50, with power and communications supplied through slip rings 30 and 31 and closure 29 with Z-axis 52.

Figure 3:
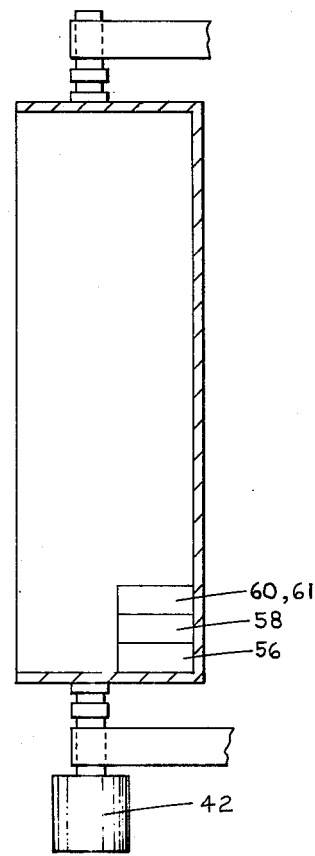

FIG. 3 shows a self-powered alternate to FIG. 2 with batteries 56, breathing atmosphere 58, and controls and communication means operating through transmitters 60 and receivers 61, obviating the need for slip rings, which may have less than the extreme reliability which will be needed in this application.

Figure 4:
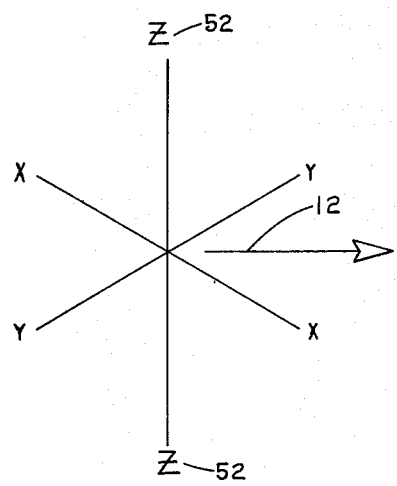

FIG. 4 shows the Z-axis, an imaginary line through the crew member's body from head to foot, normal to 12, the resultant of the forces of acceleration with X and Y-axis normal to the Z-axis and to each other.

In operation, when the accelerative forces + or −G are applied as shown by 12, the personnel carrier 28 in FIG. 1 will automatically align in a direction such that the Z-axis through crew member 54 is normal to the resultant of these forces 12. Although the assembly is shown as a freely moving universal connection, it may be automatically controlled by accelerometer 62 with servomechanisms 64 and 66 to position the Z-axis of crew member 54 in personnel carrier 28 normal to the resultant G force 12.

During any period when G force 12 reaches a predetermined level, as found by accelerometer 62, motor 42 will be energized, rotating carrier 28 about axis of rotation 52. The optimum frequency of rotation or oscillation will have been experimentally determined previously and will be ca. 150 C.P.M., more or less, in accordance with the severity and length of the exposure and the individual physiological makeup of the crew member.

I claim:

1. In a flight or space travel vehicle developing extreme forces of acceleration, a first means to orient one or more occupants of said vehicle in form-fitting restraints effective in all axes such that an imaginary Z-axis parallel to the spinal column and through the center of mass of cross-section of the body and the head perpendicular to the Z-axis is oriented normal to the resultant of said forces of acceleration at any time that a predetermined level of said forces is exceeded, with second means to rotate said occupants about said Z-axis, said first means comprising a rigid axle transverse to the longitudinal axis of said vehicle, a first swivel joint with a rigid extension angularly movable through 360° in a first plane normal of said axle being mounted on said axle, on said rigid extension a second pin swivel joint angularly movable through 180° in a second plane coincident with and in the plane of said axle, a personnel carrier with said form-fitting restraint dependent from said second pin swivel joint, a means for rotating said personnel carrier about said Z-axis, the whole having freedom of movement such that said Z-axis is automatically positioned normal to the resultant of said forces of acceleration, and said personnel carrier is rotated about said Z-axis at any time that a predetermined level of said resultant of forces of acceleration is attained.

2. The vehicle of claim 1 wherein an accelerometer system determines the level and resultant of the forces of acceleration, with means to use the accelerometer signal as the controlling signal for a servomechanism to automatically position the personnel carrier in a position with said Z-axis normal to said resultant of the forces of acceleration, said personnel carrier movable through 180° in said first plane of movement.

3. The vehicle of claim 1 wherein the means for rotating the personnel carrier are manually controlled.

4. The vehicle of claim 1 wherein the means for rotating the personnel carrier are controlled by means to automatically start rotation of the personnel carrier when a predetermined level of the resultant of the forces of acceleration is attained, and to stop rotation when said resultant is less than said predetermined level of the resultant of the forces of acceleration.

* * * * *